No. 750,473. PATENTED JAN. 26, 1904.
H. J. METZ.
HARROW.
APPLICATION FILED SEPT. 2, 1902.
NO MODEL.
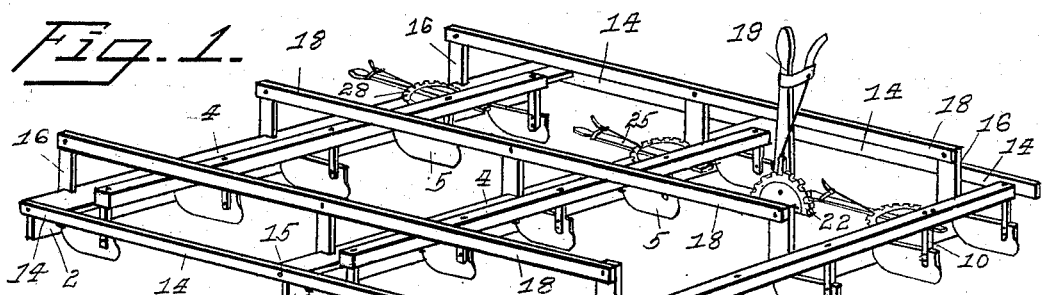
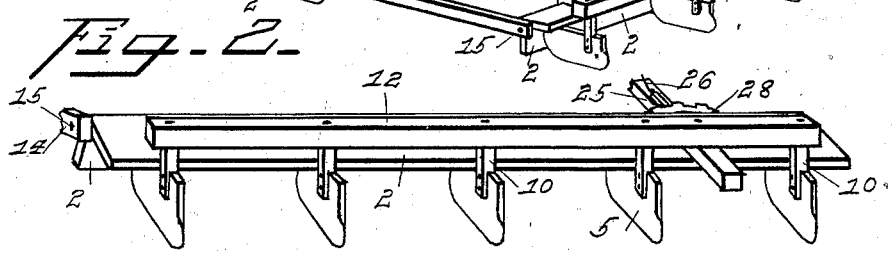
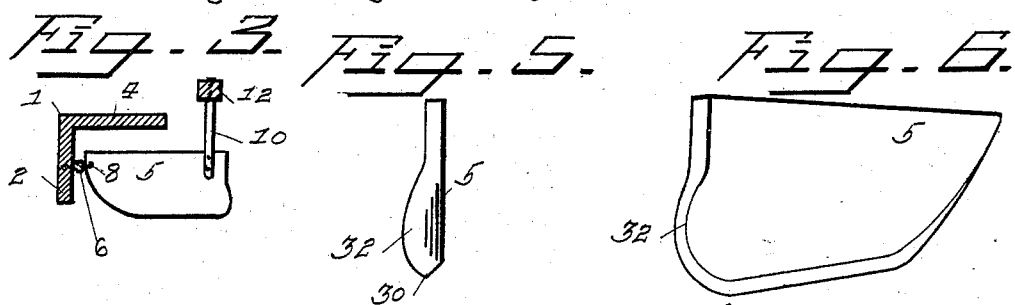
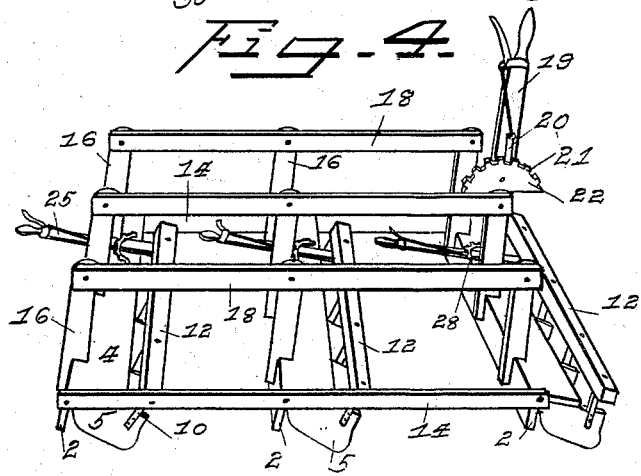
WITNESSES:
K. M. Cady
M. R. Hemmer
INVENTOR.
Harry J. Metz
BY
M. M. Cady
ATTORNEY.

No. 750,473. Patented January 26, 1904.

UNITED STATES PATENT OFFICE.

HARRY J. METZ, OF BELLEVUE, IOWA.

HARROW.

SPECIFICATION forming part of Letters Patent No. 750,473, dated January 26, 1904.

Application filed September 2, 1902. Serial No. 121,821. (No model.)

*To all whom it may concern:*

Be it known that I, HARRY J. METZ, a citizen of the United States, residing in the town of Bellevue, county of Jackson, and State of Iowa, have invented certain new and useful Improvements in Harrows; and I do hereby declare the following to be a full, clear, and exact description of the invention, which will enable others skilled in the art to which it appertains to make and use the same.

My invention relates to improvements in harrows, and the novelty consists mainly in the construction of the frame, the kind of plows or shovels, and the manner of attaching them to the frame, together with the mode of manipulating and controlling their operation.

In the following specification each constituent element of my invention is described in detail and its individual office, together with its mode of operation and the operation of the whole, is fully developed and explained when read in connection with the drawings accompanying the same, and in which—

Figure 1 is a perspective view of the harrow from one corner. Fig. 2 is a rear view of one section and the shovel pivoted thereto and turned at a slight angle. Fig. 3 is a cross-section of Fig. 2. Fig. 4 is an end view with the shovels tipped up at their forward ends and resting upon their rear corners. Fig. 5 is a rear view of one of the shovels. Fig. 6 is a side elevation of one of the shovels.

Referring to the drawings, 1 represents one of the draw-bars for each section, to which the shovels are attached at their forward ends, and consists of two parts 2 and 4 at right angles to each other. These draw-bars may be conveniently made of a single piece in the form of an angle-iron. To the part 2 are pivoted shovels 5 by an eyebolt 6, secured in the plate 2, and in each eyebolt is linked another eyebolt 8, secured to the forward end of each shovel 5. By this manner of attaching the shovels to the draw-bar they are permitted practically a universal movement at their forward ends. The rear end of each shovel is attached to a standard 10, which projects upward and is pivoted in a cross-beam 12.

A draw-bar 1, with the shovels attached, forms a section, and the desired number of sections are set one after another and are pivoted at their ends to common cross-bars 14 by the pivots 15. For the purpose of operating these sections there is rigidly attached to each draw-bar 1 a standard 16, and the upper ends of each of the standards are pivoted to a common cross-bar 18. There may be several of these cross-bars 18 upon the harrow; but I have shown only three in the drawings and three standards 16, attached to each of the draw-bars at their base and connected at their upper ends to the cross-bar 18. For the purpose of operating these sections conjointly there is set near the center of the rear draw-bar 1 instead of the standard 16 an operating-lever 19, provided with a spring-actuated dog or pawl 20, adapted to engage the teeth 21 of a sector-plate 22, secured to the top of the cross-bar 18.

For the purpose of turning and setting the the shovels at different angles there is pivoted to the bar 12 and to the plate 4 an operating-lever 25, provided with the usual spring-actuated dog 26, adapted to engage the teeth upon a sector-plate 28, secured to the plate 4. One of these levers is preferably attached to each section.

The preferable shovel I use in this harrow consists of a plate of steel of about the shape shown in Fig. 5, beveled to a cutting edge 30 upon one side and the rear end at 32 bent out at a slight angle to the plane of the shovel. It may, however, be formed without the curve and at right angles in the rear, as shown in the drawings, where most of the shovels are rectangular shape at their rear ends; but I prefer them slightly bent.

It is manifest that more than one of these completed harrows may be used at the same time by linking them together side by side.

The manner of operation of my device is substantially as follows: When it is desired to introduce the shovels into the ground, the operator as the team advances grasps the lever 19 and by drawing it backward tips transversely each of the draw-bars 1 by forcing forward and upward the plate or part 2, which draws forward and elevates the front end of the shovels 5. This same movement of the lever forces downward the rear of the part 4 upon the shovels and tilts them to the position shown in Fig. 4. This also throws the weight upon the rear of the shovels and makes them enter the ground quickly. By forcing the lever forward the shovels are brought to their normal position, as shown in Fig. 1. When it is desired to change the direction of the shovels, the operator grasps the lever 25 and turns it to any angle he chooses for the shovels to assume—as, for instance, the angle shown in Fig. 2. As there is a lever 25 upon each of the sections, one of the sections may be set straight, another at one angle, and another at another angle, and in this manner the entire surface of the ground will be thoroughly stirred and pulverized. The shovels may also be hung at different positions on the draw-bars, so that they will not track with the shovels hung to the draw-bar ahead.

The details of construction above set out may be varied by the skilled mechanic within wide limits without departing from the spirit of my invention, and certain features may be employed without its adoption as an entirety.

Having now described my invention, what I claim is—

1. In a harrow, a draw-bar, shovels attached to the draw-bar and adapted for universal movement at their forward ends, means for suspending the shovels at their rear ends, and means for deflecting the line of travel of the shovels.

2. In a harrow, draw-bars, shovels attached to the draw-bars and adapted for universal movement at their forward ends and suspended at their rear ends, means for deflecting the line of travel of the shovels and means for tilting the shovels longitudinally.

3. In a harrow, a draw-bar, shovels attached to the draw-bar and adapted for universal movement at their forward ends and suspended at their rear ends, and means for tilting the shovels longitudinally.

4. In a harrow, a frame, a draw-bar pivoted to the frame, shovels attached to the draw-bar and adapted for universal movement at their forward ends, means for deflecting the line of travel of the shovels, and a lever for tilting the shovels longitudinally.

5. In a harrow, a draw-bar pivoted in the frame, shovels loosely attached at their forward ends to the draw-bar, and pivotally suspended from their rear ends, and a lever for deflecting the line of travel of the shovels.

6. In a harrow, a frame, draw-bars pivoted in the frame, shovels attached at their forward ends to the draw-bars by link attachment and pivotally suspended at their rear ends, and means for tilting the shovels longitudinally.

7. In a harrow, a frame, draw-bars pivoted in the frame, shovels linked to the draw-bars and adapted for universal movement at their forward ends, and a lever for deflecting the line of travel of the shovels.

8. In a harrow a series of pivotally-hung draw-bars, means for connecting the draw-bars together, shovels loosely attached at their forward ends to the draw-bars and a lever attached to one of the draw-bars for rotating said bars and tilting the shovels longitudinally upon their rear ends.

9. In a harrow, a frame, draw-bars pivoted to the frame and connected together, shovels universally attached at their forward ends to the draw-bars and pivotally suspended at their rear ends, means for deflecting the line of travel of the shovels and a lever for tilting the shovels on their rear ends.

10. In a harrow, a series of draw-bars each formed substantially as described and shown said draw-bars pivoted in the frame and connected together, shovels loosely attached to the draw-bars, a lever attached to one of the draw-bars for rotating the draw-bars and tilting the shovels longitudinally.

11. In a harrow, a frame, draw-bars formed in angle shape pivotally set in the frame, connection between the draw-bars, shovels loosely attached to the draw-bars outside of the center of rotation of the draw-bars, means secured to the shovels for deflecting their line of travel, and a lever secured to one of the draw-bars for rotating the draw-bars to tilt the shovels longitudinally and force them into the ground.

12. In a harrow, the combination of a frame, draw-bars connected together and pivoted in the frame, shovels loosely attached to the draw-bars, a lever attached to one of the draw-bars for rotating the same and tilting the shovels, a dog secured to the lever and adapted to engage a sector-plate to hold the shovels in their tilted position, a bar 12, means for pivoting the rear of the shovels to said bar and a lever attached to a draw-bar and bar 12 for deflecting the line of travel of the shovels.

13. In a harrow, a frame, draw-bars pivoted to the frame, shovels loosely attached to the draw-bars at their forward ends, means for pivoting the shovels at their rear ends, a lever for rotating the draw-bars to raise the forward ends of the shovels and depress their rear ends by contact with the rear of the draw-bars, means attached to the lever for holding the shovels in their longitudinally-tilted position, levers secured to the draw-bars and connected to the means for pivoting the shovels at their rear ends for deflecting the shovels in their line of travel and means for holding the shovels in such deflected position.

14. In a harrow, one or more draw-bars, shovels as described loosely attached at their forward ends to the draw-bars and pivotally suspended at their rear ends and means for deflecting the line of travel of the shovels.

15. In a harrow, a draw-bar of angle-bar shape, shovels as described loosely attached to the draw-bars outside of the center of rotation of the draw-bar and adapted for universal movement at their forward ends, means for pivotally suspending the shovels at their rear ends, a lever for deflecting the line of travel of the shovels and a lever for forcing the shovels into the ground by raising the forward ends of the shovels and depressing their rear ends by contact with the draw-bars.

16. In a harrow, a frame, draw-bars of angle-bar shape, shovels attached at their forward ends to the draw-bars at an angle to the center of rotation of the draw-bars and pivotally suspended at their rear ends, connection between the draw-bars, and a lever for rotating the draw-bars to force the shovels into the ground by raising the front end of the shovels and depressing the rear ends by contact with the draw-bars.

In testimony whereof I have signed my name to this specification in the presence of two subscribing witnesses.

HARRY J. METZ.

Witnesses:
M. M. CADY,
CHAS. YOUNG.